US012566862B2

(12) United States Patent
Tam et al.

(10) Patent No.: US 12,566,862 B2
(45) Date of Patent: Mar. 3, 2026

(54) METHOD AND SYSTEM FOR DYNAMICALLY ASSESSING CURRENT RISK ASSOCIATED WITH A MARITIME ACTIVITY

(71) Applicant: University of Plymouth, Plymouth (GB)

(72) Inventors: Kimberly Tam, Plymouth (GB); Kevin Forshaw, Fordingbridge (GB); Kevin David Jones, Ivybridge (GB)

(73) Assignee: University of Plymouth, Plymouth Devon (GB)

( * ) Notice: Subject to any disclaimer, the term of this patent is extended or adjusted under 35 U.S.C. 154(b) by 383 days.

(21) Appl. No.: 17/674,485

(22) Filed: Feb. 17, 2022

(65) Prior Publication Data

US 2022/0261483 A1     Aug. 18, 2022

Related U.S. Application Data

(60) Provisional application No. 63/150,521, filed on Feb. 17, 2021.

(51) Int. Cl.
*G06F 21/57* (2013.01)
*G06Q 10/047* (2023.01)
*G06Q 10/0635* (2023.01)

(52) U.S. Cl.
CPC ....... *G06F 21/577* (2013.01); *G06Q 10/0635* (2013.01); *G06F 2221/034* (2013.01); *G06Q 10/047* (2013.01)

(58) Field of Classification Search
CPC ............ G06F 21/577; G06F 2221/034; G06Q 10/0635; G06Q 10/047
(Continued)

(56) References Cited

U.S. PATENT DOCUMENTS 10,749,888 B2 *  8/2020  Carmichael ............ G06N 20/00
11,563,770 B2 *  1/2023  Mizrahi .............. H04L 63/1441
(Continued)

FOREIGN PATENT DOCUMENTS

KR      20230103283 A  *  7/2023  ............. H04L 67/12
KR      102594522 B1 *  10/2023  ........... G05D 1/0055
WO   WO 2020/141486      7/2020

OTHER PUBLICATIONS

Kimberly Tam, MaCRA: a model-based framework for maritime cyber-risk assessment, WMU Journal of Maritime Affairs(2019) 18:129-163, (Year: 2019).*

(Continued)

*Primary Examiner* — Abdallah A El-Hage Hassan
(74) *Attorney, Agent, or Firm* — Hickman Becker Bingham Ledesma LLP

(57) ABSTRACT

An approach is provided for a maritime cyber risk assessment profiling tool. The tool accesses a risk profile for one or more maritime vessels, wherein the risk profile includes a plurality of attack vectors targeting a plurality of systems associated with the one or more maritime vessels, and wherein each of the plurality of attack vectors is associated with a quantified risk value. The tool retrieves a risk update from a dynamic risk data source. The tool updates the risk profile based on the risk update, including a first attack vector. The tool causes display of a risk assessment for the one or more maritime vessels based on the updated risk profile, wherein the risk assessment includes risk values assigned for a particular set of the plurality of systems including a risk value that changed based on the update to the first attack vector.

20 Claims, 5 Drawing Sheets

(58) Field of Classification Search
   USPC ........................................................ 705/7.28
   See application file for complete search history.

(56)                    References Cited

U.S. PATENT DOCUMENTS

| | | | | |
|---|---|---|---|---|
| 12,363,144 | B2 * | 7/2025 | Chiba | ..................... G06F 21/55 |
| 2006/0025925 | A1 * | 2/2006 | Fushiki | ........... G08G 1/096775 |
| | | | | 701/423 |
| 2014/0160165 | A1 * | 6/2014 | Kim | .................... G01C 21/005 |
| | | | | 345/633 |
| 2018/0091553 | A1 * | 3/2018 | Mandyam | .......... H04L 63/1433 |
| 2021/0343158 | A1 * | 11/2021 | Gonzalez | ................ G08G 5/57 |
| 2022/0374797 | A1 * | 11/2022 | Kalinski | ................. G06N 3/04 |

OTHER PUBLICATIONS

Tam, Kimberly, et al., "MaCRA: a model-based framework for maritime cyber-risk assessment", Univ of Plymouth, Pearl, http://hdl.handle.net/10026.1/13138, Wmu Jour. Of Maritime Affairs, World Maritime Univ, Jan. 28, 2019, 39pgs.
The International Searching Authority, "Search Report" in Application No. PCT/US2022/016779, dated May 13, 2022, 12 pages.
Current Claims in Application No. PCT/US2022/016779, dated May 2022, 4 pages.

* cited by examiner

COMPUTING DEVICE 110A

PROCESSOR 120

DISPLAY 140

USER INTERFACE 145

MEMORY 130

RISK PROFILER 150

INTERACTIVE RISK MODEL 152

DYNAMIC RISK UPDATER 154

ADMINISTRATIVE TOOLS 156

VESSEL RISK PROFILE 160

| | |
|---|---|
| IT/OT SYSTEM RISKS 162 | LOCATION RISKS 165 |
| ATTACKER PROFILES 163 | TIME & DATE RISKS 166 |
| CARGO & USE RISKS 164 | MITIGATION DATA 167 |

DATABASE 180

NETWORK 170

COMPUTING DEVICE 110B

DYNAMIC RISK DATA SOURCE 190A

DYNAMIC RISK DATA SOURCE 190B

DYNAMIC RISK DATA SOURCE 190C

FIG. 2B

USER INTERFACE 145B

COMPANY NAME – PROFILE / VESSEL / FLEET NAME          ▽

| Profiles | Attackers | Export | Route | Users | Admin |

Select Mitigations          262

Sort by:  | Default (Risk Reduction)          ▽ |

| Mitigation Action | Risk Reduction | Effort |
|---|---|---|
| 1. Severe access vulnerability discovered in current ECDIS v1.2 | | |
| ☑ (1) Upgrade ECDIS to v1.3 | Navigation -1.0 | High |
| ☐ (2) Revert ECDIS to v1.1 | Navigation -0.5 | Medium |
| ☐ (3) Block ports to ECDIS | Navigation -0.3 | Low |
| 2. VDR system recording failure | | |
| ☑ (1) Upgrade VDR system | VDR -1.5 | High |
| ☐ (2) Repair VDR system | VDR -1.0 | Medium |
| 3. General preventative measures | | |
| ☑ ECDIS Cyber Training | Navigation -0.2 | Low |
| ☑ AIS Cyber Training | Tracking -0.2 | Low |

( Update )                    ( Cancel )

Figure 3:
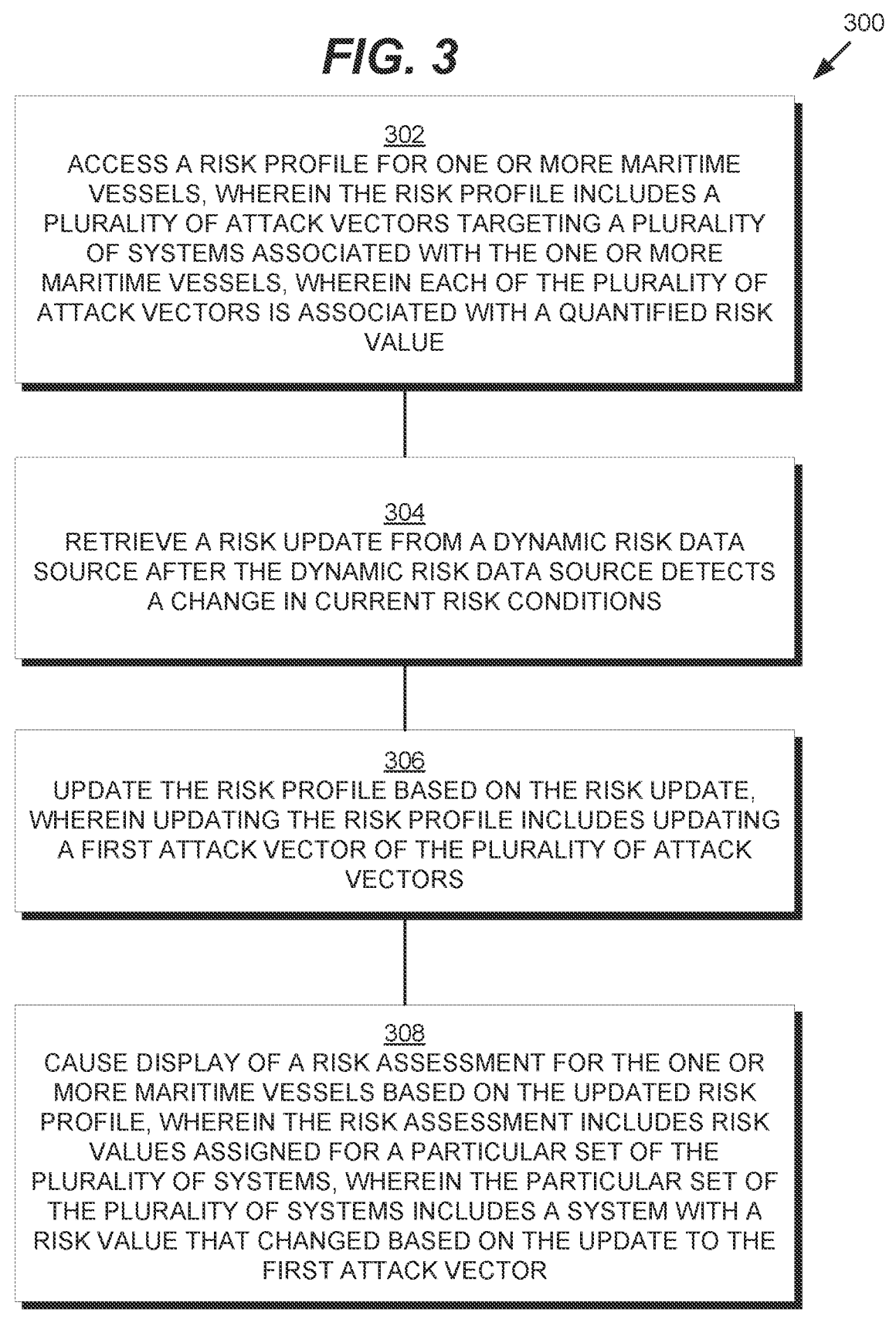

302
ACCESS A RISK PROFILE FOR ONE OR MORE MARITIME VESSELS, WHEREIN THE RISK PROFILE INCLUDES A PLURALITY OF ATTACK VECTORS TARGETING A PLURALITY OF SYSTEMS ASSOCIATED WITH THE ONE OR MORE MARITIME VESSELS, WHEREIN EACH OF THE PLURALITY OF ATTACK VECTORS IS ASSOCIATED WITH A QUANTIFIED RISK VALUE

304
RETRIEVE A RISK UPDATE FROM A DYNAMIC RISK DATA SOURCE AFTER THE DYNAMIC RISK DATA SOURCE DETECTS A CHANGE IN CURRENT RISK CONDITIONS

306
UPDATE THE RISK PROFILE BASED ON THE RISK UPDATE, WHEREIN UPDATING THE RISK PROFILE INCLUDES UPDATING A FIRST ATTACK VECTOR OF THE PLURALITY OF ATTACK VECTORS

308
CAUSE DISPLAY OF A RISK ASSESSMENT FOR THE ONE OR MORE MARITIME VESSELS BASED ON THE UPDATED RISK PROFILE, WHEREIN THE RISK ASSESSMENT INCLUDES RISK VALUES ASSIGNED FOR A PARTICULAR SET OF THE PLURALITY OF SYSTEMS, WHEREIN THE PARTICULAR SET OF THE PLURALITY OF SYSTEMS INCLUDES A SYSTEM WITH A RISK VALUE THAT CHANGED BASED ON THE UPDATE TO THE FIRST ATTACK VECTOR

METHOD AND SYSTEM FOR DYNAMICALLY ASSESSING CURRENT RISK ASSOCIATED WITH A MARITIME ACTIVITY

BENEFIT CLAIM

This application claims the benefit as a provisional application 63/150,521, filed Feb. 17, 2021, by Kimberly Tam et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE INVENTION

The techniques described herein relate to software tools for risk profiling, and more specifically, to techniques for dynamically assessing current risk associated with a maritime activity.

BACKGROUND

Maritime Cyber incidents are occurring but go largely unreported. Beyond intentional and accidental malware infections, targeted attacks and state sponsored terrorism could lead to serious disruption to operations, loss of life and threats to National Security. Currently, mitigation approaches are limited to Information Technology (IT) aspects of the ship's system of systems. However, vessels also incorporate Operational Technology (OT) of increasing complexity that requires a different approach for maritime specific problems.

Due to growing demands for cyber-safety and technology, a dynamic risk analysis framework provided by the Maritime Cyber Risk Assessment Framework (MaCRA) has been developed. Details regarding MaCRA are available at: Tam, K., Jones, K. MaCRA: a model-based framework for maritime cyber-risk assessment. *WMU J Mara Affairs* 18, 129-163 (2019). https://doi.org/10.1007/s13437-019-00162-2, the contents of which are incorporated herein by reference.

While a significant percentage of the global fleet is devoted to the shipping industry (container, bulk, and tanker) there is still a wide variety of ships for pleasure, specialized cargo, military, scientific exploration, and more. While increased connectivity between ships, personal devices, and on-shore infrastructure has improved operational efficiency and physical safety, it also increases vulnerabilities across IT and OT systems. This ship diversity mandates that a risk assessment solution be flexible without losing details, which is why MaCRA was proposed.

While physical security and accident statistics are well understood in the maritime sector, cyber-security is unlike both of these. Normally, a system is considered functioning, or broken. However, with cyber-attacks, a non-functioning system may not be broken and a functioning system may not be trustworthy. Also, an accident is considered high risk if it is likely to happen, whilst a cyber-attack's risk is based on how easily an adversary can make it happen. Therefore, a vulnerability that may be low risk for an accident may have high risk as a potential cyber-attack. While the majority of maritime cybercrimes lack the sophistication and magnitude of on-shore attacks, complex technology trends in a lucrative global market demands a proactive approach to maritime cyber risks. Moreover, based on the maritime technology growth, understanding the threats against today's ships will better protect emergent classes of vessels (autonomous ships).

Unfortunately, MaCRA is merely a conceptual framework, and not an actual implementation of a risk assessment system. There is a clear need to develop an implementation of MaCRA, as there are no statistics or history to be used to assess cyber-related risks. Furthermore, as cyber-elements can change quickly and significantly alter risks, it is worth developing an adaptive solution that can update risk profiles without requiring a completely new assessment each time. The ability to model complex risks while providing only the necessary data for each task and user maintains a high level of quality of information while not burdening an analyst with more than they need to know.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Implementations are depicted by way of example, and not by way of limitation, in the figures of the accompanying drawings and in which like reference numerals refer to similar elements.

FIG. 1 is a block diagram that depicts a system for implementing a maritime cyber risk assessment profiling tool, as described herein.

FIG. 2B is a diagram that depicts the GUI of FIG. 2A after receiving a user input for selecting mitigations to be applied to the active risk model profile.

FIG. 3 is a flow diagram that depicts an approach for implementing a maritime cyber risk assessment profiling tool.

DETAILED DESCRIPTION

Figure 2A:
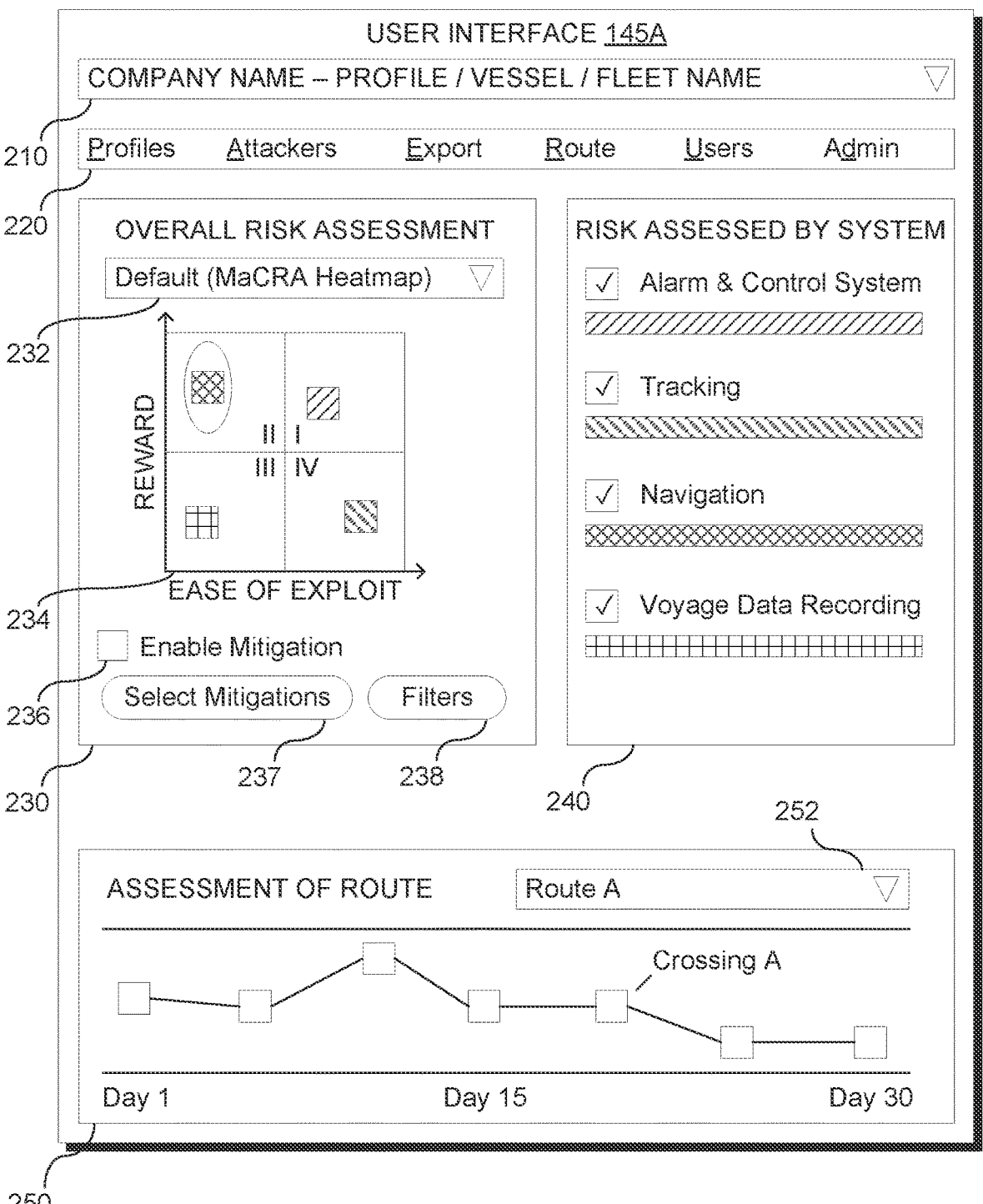
FIG. 2A is a diagram that depicts an example graphical user interface (GUI) of a maritime cyber risk assessment profiling tool for an active risk model profile.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Overview
 II. Architecture
III. Risk Profiler User Interface
 IV. Mitigation User Interface
V. Dynamic Risk Mitigation User Interface
 VI. Example Implementation Process
I. Overview A maritime cyber risk assessment profiling tool is provided for interactively modeling and assessing vessel specific IT and OT system risk profiles and exploring available mitigations to reduce overall risk and meet regulatory compliance requirements. To determine potential risks and attack vectors, the tool may access an anonymized operational database of current and past incidents and known system vulnerabilities, applied to operational specific parameters around vessel type, cargo carried, and vessel route to identify both technological and human interventions required to reduce risk of cyber incidents. Besides examining a risk model for an individual vessel, the tool may also be used to model risks at a larger scale with company or fleet aggregated risk profiles.

To update the risk model, the tool may use dynamic data callout interfaces to ingest new risk related data from internal or external data sources. Accordingly, the tool is enabled to provide dynamic adaptation to changing conditions while a vessel is progressing through a route, rather than providing a risk report that is only valid for a single point in time. Additionally, when a risk model is updated with projected increased risk for a route in progress, the tool may suggest alternative routes to reduce the projected increased risk.

To provide the most relevant information, the tool may be customized with user specific filters and views to emphasize the information most important for each user. For example, information can be tailored according to user privileges or role groupings. Accordingly, the tool enables shipping operators, insurers, engineers, captains, crew members, and other parties and stakeholders to accurately determine operational-specific mitigation measures required to reduce ongoing and persistent threats of cyberattacks and other risks to their businesses.

Besides providing actionable information in the form of reports, graphs, charts, tables, lists, maps, and other representations, the tool may also connect to vessel systems to implement mitigations and perform other actions. For example, the tool can implement alternative route suggestions by sending instructions to navigation and other related vessel systems, or the tool can implement suggested software mitigations by applying patches or rollbacks to vessel systems.

Techniques discussed herein enable a user to use a maritime cyber risk assessment profiling tool to identify the risks of highest concern and formulate a plan for mitigating those risks. As the tool can be customized for each user, the user can quickly determine the most relevant actionable information. Further, since the risk model can be updated using dynamic data callout interfaces, the user is also enabled to respond to changing conditions even during routes in progress. The tool may optionally implement mitigations and recommendations by directly instructing vessel systems, enabling rapid implementation with reduced risk of human error. Thus, a flexible, dynamic, efficient, and resilient maritime cyber risk assessment profiling tool is provided.

II. Architecture

FIG. 1 is a block diagram that depicts a system 100 for implementing a maritime cyber risk assessment profiling tool as described herein. System 100 includes computing device 110A, computing device 110B, network 170, database 180, dynamic risk data source 190A, dynamic risk data source 190B, and dynamic risk data source 190C. Computing device 110 includes processor 120, memory 130, display 140, and vessel risk profile 160. Memory 130 includes risk profiler 150, which includes interactive risk model 152, dynamic risk updater 154, and administrative tools 156. Display 140 includes user interface 145. Vessel risk profile 160 includes IT/OT system risks 162, attacker profiles 163, cargo & use risks 164, location risks 165, time & date risks 166, and mitigation data 167. While not specifically shown in FIG. 1, components of computing device 110A may communicate via one or more data buses. The components of system 100 are only exemplary and other configurations of system 100 may be used.

In one implementation, computing device 110A may correspond to a tablet, laptop, desktop, smartphone, or other computing device that can be used on the vessels for which risk assessment is desired. Accordingly, computing device 110A may store one or more vessel risk profile 160 for modeling the risks specific to the vessels. To model risks for a larger group of vessels, such as a company or fleet in aggregate, a user may use computing device 110B, which may contain similar components as computing device 110A but with access to aggregate risk profiles. Risk modeling calculations may be performed locally on computing device 110A and 110B and/or may be offloaded to cloud servers accessible via network 170 or servers on a local intranet. Thus, portions of risk profiler 150 may be provided via software as a service (SaaS) or an online web-based or app-based portal. When risk modeling is performed locally, computing device 110B may be a higher performance device in comparison to computing device 110A to handle the increased processing demands of modeling a company or fleet in aggregate.

Risk profiler 150 may utilize processor 120, memory 130, and other computing resources not specifically depicted. Processor 120 may be any type of general-purpose single or multi core processor, or a specialized processor such as application-specific integrated circuit (ASIC) or field programmable gate array (FPGA), and more than one processor 120 may also be present. Memory 130 may be any type of memory, such as a random access memory (RAM) or other dynamic storage device.

Risk profiler 150 may use information retrieved from database 180 to build vessel risk profile 160, or information from database 180 may be used as a template that is further customized by the user for the specific configuration of a vessel, company, or fleet. Database 180 may contain risk information for maritime threats that may include but are not limited to: (1) System vulnerability and effect, (2) ease-of-exploit, and (3) reward. The risk information may correspond to IT/OT system risks 162.

A system vulnerability defines the available attack vector against a specific vendor and version of a maritime system or software, and the effect defines the result of a successful attack, which may be quantified by a severity rating. For example, one system vulnerability and effect entry may indicate that a vessel radar system provided by vendor A with a firmware revision 1.5 is vulnerable to a buffer overflow attack that, when successful, grants privileged root access. Since root access allows execution of arbitrary code, the effect may be listed as severe. Ease-of-exploit defines the ease by which an attack vector can be exploited, which can range from execution of a pre-existing script (easy) or a sophisticated targeted attack using strict timings and customized exploit payloads (difficult). Reward defines the value of successfully using the exploit, which can be valued differently for different attackers having different motivations, and further affected by various factors such as vessel cargo, vessel usage including any passenger information, vessel location, and time and date of route. This may correspond to information to be stored in attacker profiles 163, cargo & use risks 164, location risks 165, and time & date risks 166.

Each vulnerability effect, ease-of-exploit, and reward may be quantified by grading according to a numeric range, such as from 1 (low severity effect, easy to exploit, low reward) to 10 (high severity effect, difficult to exploit, high reward), and grades may be a single value or a range of values. Risk information can be combined into a profile according to the specific system configuration of a vessel, which can be defined according to vessel type and consequently equipment on board (IT/OT system risks 162), cargo or passengers being carried or vessel actions such as fishing, resource gathering, or other activities (cargo & use risks 164), and Vessel Routing (location risks 165 and time & date risks 166), the latter aspects being used to determine Attacker Motivation (attacker profiles 163). Profiles may also be aggregated to provide risk models for larger maritime groups such as companies and fleets.

Database 180 may also include data regarding mitigating actions for reducing the risk of identified attack vectors, or data to be stored in mitigation data 167. For example, mitigating actions may include upgrading or reverting software versions, replacement or repair of hardware, blocking network access or ports, providing personnel training, and other actions. Mitigating actions may reduce risk values posed by associated attack vectors (IT/OT system risks 162). Further, mitigating actions may be associated with a cost or difficulty of implementation so that users can weigh the costs of alternative mitigations and choose an appropriate mitigation strategy according to available resources and efficient risk reduction.

Computing device 110A may thus include one or more vessel risk profile 160 based on data from database 180. The components of vessel risk profile 160 may further be updated according to user adjustments via administrative tools 156 and dynamic data callout interfaces processed by dynamic risk updater 154. For example, dynamic risk updater 154 may retrieve data updates from one or more data sources such as dynamic risk data source 190A-190C. Each of dynamic risk data source 190A-190C may provide a data update after a change in current risk conditions is detected. For example, dynamic risk data source 190A may correspond to a weather service that can provide updated weather forecasts for inclement and risky weather that may be encountered on vessel routes. Dynamic risk data source 190B may correspond to a news or social media aggregator that can provide up to date information regarding geopolitical risks, piracy, armed conflicts, criminal activity, and other risks that may be encountered during a route. Dynamic risk data source 190C may correspond to a vulnerability database that tracks and discloses newly discovered bugs and vulnerabilities of vessel systems such as navigation, tracking, control, data recording, and other systems. While three dynamic risk data sources are illustrated, any number of data sources can be supported. Further, data updates from each dynamic risk data source may be retrieved in a variety of ways, such as by polling or by push notification. Polling rates may be adjusted according to risk magnitude. For example, if a severe vulnerability is discovered, then the polling rate may be increased temporarily until no significant vulnerabilities are found for a threshold length of time.

Interactive risk model 152 may interpret the information from vessel risk profile 160 to provide user interface 145 shown on display 140, allowing a user to view a risk assessment providing various interactive reports and graphical representations of risk and mitigations. The interactive risk model 152 may also tailor the user interface 145 according to the current user of computing device 110A, for example by applying filters or by limiting or emphasizing views to specific systems or risk aspects that are most relevant or actionable by the user. For example, the concerns of an insurance adjustor may be primarily concerned with monetary risk, whereas the concerns of a systems engineer may be primarily concerned with risks directed to systems software, firmware, and networks, whereas the concerns of a captain may be primarily regarding cargo preservation, crew and passenger safety, and route timeliness. These risks may be weighted and filtered according to the concerns of each user role so that the most relevant and actionable information is provided.

III. Risk Profiler User Interface

FIG. 2A is a diagram that depicts an example graphical user interface (GUI) of a maritime cyber risk assessment profiling tool for an active risk model profile. User interface 145A may correspond to user interface 145 from FIG. 1. User interface 145A includes profile selector 210, menu bar 220, overall risk assessment 230, system risk assessment 240, and route risk assessment 250. Overall risk assessment 230 includes representation selector 232, representation 234, mitigation toggle 236, mitigation selection button 237, and filter button 238. Route risk assessment 250 includes route selector 252.

Profile selector 210 may be used to select an existing profile, such as vessel risk profile 160, or an aggregation of profiles to analyze a portion or an entirety of a company or fleet. The aggregation of profiles may also be a standalone profile. A profile enables a risk assessment to be built and dynamically updated for a vessel or grouping of vessels. A profile may therefore define a selection of vessels, the equipment or maritime systems installed on the vessels including the vendors and software or firmware versions, the cargo held on the vessels, the passengers, crew, captain, and other individuals associated with the vessels, the planned routes that the vessels will be traversing, the planned actions the vessel will be performing, and the risk and mitigation data that are applicable for the vessel systems defined in the profile, with some examples shown in vessel risk profile 160 of FIG. 1. For example, a profile may be defined for a single vessel, define all the maritime systems installed on the single vessel, indicate that the cargo includes fruit from country A for export sale, indicate a listing of crew, captain, and passengers to be present during the route, include a planned route "A" for traversing from import country "A" to export country "B", indicate that the vessel will be only travelling without performing other actions, and include all relevant risk and mitigation data for the maritime systems defined in the profile, which may be imported from database 180.

The profiles may be based on existing profiles or templates available from database 180 or may be newly defined, for example by using the profile option in menu bar 220. Available profiles to select may be limited according to user permissions. For example, captains and crew may be only able to view profiles for assigned vessels, whereas management level users may be able to view company and fleet level aggregate profiles. The existing profiles may be generic profiles widely applicable to most vessels with some minor customization and adjustment applied to match the actual equipment and systems installed on specific vessels.

In some implementations, information from database 180 and/or dynamic risk data sources 190A-190C may be duplicated as local copies within the profile stored at the point of use, such as within vessel risk profile 160 for computing device 110A or a fleet-wide risk profile for computing device 110B. This may be helpful when access to network 170 is not guaranteed and the ability to perform offline risk analysis is desired. In other implementations, the information from database 180 and/or dynamic risk data sources 190A-190C may be streamed on demand as needed via network 170. In this case, the profiles may omit local copies of data and instead store references to database 180 and/or dynamic risk data sources 190A-190C. In yet other implementations, a hybrid approach may be utilized wherein data is duplicated locally for certain data sources (e.g. database 180) and referenced on demand for other data sources (e.g. dynamic risk data sources 190A-190C).

Menu bar 220 may be used to view and create data and perform various administrative tasks. The "profiles" option may allow a user to create new profiles and aggregations, if allowed by user permissions, and to edit existing profiles, e.g. by changing installed systems, including versions and vendors, equipment, and other vessel parameters.

The "export" option may allow the user to share or synchronize locally stored profiles or generate risk reports for printing or digital distribution, which may provide a traditional non-interactive risk assessment report for a single point in time. This may be useful for passing inspections, providing compliance reports, and sharing reports with other devices and users.

The "route" option may allow the user to define a vessel travel route according to one or more stops or travel segments, which may be predefined or newly generated. For example, a map may be provided that allows the user to select commonly used routes or define a new route, and to simulate the movement of vessels on the map over time. The segments of the routes may be color coded according to the overall risk at each segment. When the profile is for a company or fleet, the map may show the routes for all vessels concurrently while allowing the user to search for a specific vessel to drill down if desired. Further, a projected risk over time or route risk assessment 250 may also be shown concurrently while simulating vessel movement on the map, allowing the user to visualize projected risk as routes are traversed on the map.

The "users" option may allow a user to switch to a different account, or to define new users and set user permissions, if the user is an administrator. The "admin" option may allow a user with administrative permissions to perform administrative functions with administrative tools 156. For example, the user can connect or disconnect to one or more databases, dynamic risk data sources, networks, vessel systems, and other components, and modify, create, or delete data entries in the connected components.

The "attackers" option may allow a user to select specific types of attackers to consider when determining the reward value of each attack vector. For example, attackers may include terrorists, hacktivists, competitors, criminals, hostile nations, organized crime, murderers, and other threats. The perceived rewards for successfully exploiting attack vectors may be different for each category of attacker. For example, terrorists may be less concerned with attack vectors that enable valuable cargo to be stolen, but more interested in disrupting ship controls to cause accidents and injury to crew and passengers. On the other hand, the opposite may be true for organized crime. Thus, the reward values may be weighted according to the motivations of each attacker group, or the plurality of attack vectors may be assigned a distinct reward rating according to the motivations of each attacker that is selected.

In overall risk assessment 230, the user can quickly identify the most relevant and dangerous risks for the currently active profile. For example, in the default "MaCRA Heatmap" indicated by representation selector 232, the representation 234 plots the risks or attack vectors in system risk assessment 240 using a heatmap, wherein the x axis corresponds to ease of exploit and the y axis corresponds to reward. Risks in quadrant I are the highest risk (high reward AND easy to exploit), risks in quadrant II and IV are moderate risk (high reward OR easy to exploit), and risks in quadrant III are relatively low risk (low reward AND difficult to exploit). The heatmap may also be color coded, wherein low risk is blue colored and high risk is red colored. Thus, an assessment of overall risk can be quickly determined at a glance. Further, risks that have a wide range of possible risk can be illustrated by using a corresponding shape such as the oval shown in quadrant II for the navigation system. Besides the default "MaCRA Heatmap", other representations can be selected using representation selector 232. For example, NIST, FMEA, and other frameworks may be supported for risk modeling and compliance testing.

To determine a plan for reducing the risks shown in overall risk assessment 230, the user can use mitigation selection button 237 and mitigation toggle 236 to visualize the effect of applying one or more mitigating actions. For example, based on the selected mitigations, the positioning of the risks in representation 234 may be shifted left and downwards to reflect the reduced risk (reduced reward and/or higher exploit difficulty). Optionally, the user may be prompted to approve commands or instructions to be issued to one or more vessel systems to implement some of the selected mitigations automatically. Some example mitigations are shown in conjunction with FIG. 2B, as described further below.

System risk assessment 240 shows that all available systems are to be tracked for risks, including the alarm & control system, the tracking system, the navigation system, and the voyage data recording system. Each system may define further subsystems, and each system is distinguishable by a fill pattern. Other implementations may distinguish systems with a unique shape for each system. Further, the shapes may be filled with colors indicating possible risk values.

Depending on the user that is logged in, only a portion of these systems may be checked for consideration in the overall risk assessment. For example, a data recorder compliance officer may only be interested in the voyage data recording (VDR) system, and therefore all other systems may be unchecked for this user. In another example, a risk analyst may only be interested in risks above a certain threshold. In this case, filters may be automatically applied to hide attack vectors that are below a threshold risk value. Thus, the cutoff for the X and Y axis in representation 234 may be adjusted according to the filters. The user may optionally adjust these filters and thresholds using filter button 238. In yet another example, an insurance adjuster may be primarily interested in minimizing monetary losses. In this case, the default representation selected for representation selector 232 may instead select a different heatmap wherein one axis corresponds to monetary loss instead of reward for attackers, or alternatively, monetary loss may be weighted more heavily in the reward calculation.

Besides providing an overall risk assessment at a single point in time, a risk assessment over time may be provided via route risk assessment 250. Route selector 252 may select an intended route for the vessel or vessels selected in profile selector 210. As shown in route risk assessment 250, the overall risk can be projected for the entire route selected by route selector 252, and an estimate of the arrival time may also be provided. Key positions in the route may also be identified, such as travelling through a crossing or stopping at a port. By allowing the user to visualize the projected risks and voyage time of different routes, the user can select the most appropriate route according to risk tolerance and target time to destination.

IV. Mitigation User Interface

FIG. 2B is a diagram that depicts user interface 145A of FIG. 2A after receiving a user input for mitigation selection button 237 to select mitigations to be applied to the active risk model profile indicated by profile selector 210. User interface 145B may correspond to user interface 145 from FIG. 1. User interface 145B includes mitigation selector 260. Mitigation selector 260 includes sort selector 262 and update button 264.

Sort selector 262 may be used to select a preferred sort order for mitigations. As shown in FIG. 2B, the default sort order is for maximum system risk reduction. However, the sort order can be changed to balance risk reduction with implementation effort, or to prioritize mitigating against specific threats, such as monetary loss, or to prioritize against certain attackers, or to protect the safety of identified passengers or crew members.

As shown in mitigation selector 260, a list of attack vectors is provided along with possible mitigations to reduce the risk of each attack vector. Some mitigations for a given attack vector may be mutually exclusive, whereas other mitigations may be carried out concurrently. In the example shown in FIG. 2B, the mutually exclusive options are indicated as numbered choices.

Referring to the first attack vector, a severe access vulnerability has been discovered for the current v1.2 version of the Electronic Chart Display and Information System (ECDIS) set as installed for the active risk profile. Three possible mitigations are suggested: (1) Upgrade to v1.3, (2) Revert to v1.1, and (3) Block ports to ECDIS. Upgrading to the latest version may reduce risk the most (−1.0) but may require the most effort to update and configure correctly. For example, upgrading may require other related systems to be upgraded as well. Further, the latest version may have less time being tested in production environments and may have unknown attack vectors that have yet to be discovered. For these reasons, mitigation (2) may be selected, wherein the system is reverted to a known reliable older version. However, the older version may have missing functionality or other vulnerabilities, and therefore the risk reduction may be less (−0.5) compared to a version upgrade. Finally, mitigation (3) may be selected, wherein certain network ports are blocked but the system version remains as-is at v1.2. The risk reduction in this case may be low (−0.3), but the port blocking is relatively easy to implement and may be a good stopgap measure until a full security audit can be carried out.

Referring to the second attack vector, a recording failure has been detected in the vessel data recorder (VDR) system. Two mitigating options are provided: (1) upgrading the VDR system (−1.5) or (2) repairing the VDR system (−1.0). Upgrading may provide a more robust VDR system but may incur a significant financial and configuration cost. Repairing may be easier to implement, but reliability may be less when compared to the upgraded VDR system. Thus, the decision may depend on whether spare budget is available and whether other risk factors can be mitigated to still meet compliance requirements.

Referring to the third attack vector, this may be a catchall for preventative measures that are not directed to a specific attack vector. Accordingly, the suggested mitigations can be carried out concurrently. Two cyber training courses for crew are suggested, which are projected to reduce risk by teaching cyber risk best practices to improve compliance.

After triggering update button 264, the user interface may transition back to the main overview shown in FIG. 2A. After toggling mitigation toggle 236, the positions of the risks in representation 235 may be adjusted according to the mitigations selected previously in FIG. 2B. Route risk assessment 250 may be updated as well. While the mitigations may usually reduce risk, in some situations the risk may increase, particularly when sort selector 262 is configured to focus on another goal other than overall risk mitigation. In either case, the user can quickly ascertain the changes to the risk values due to the selected mitigations. By experimenting with various configurations of selected mitigations, the user can formulate a mitigation plan to optimally reduce risk.

V. Dynamic Risk Mitigation User Interface

Figure 2C:
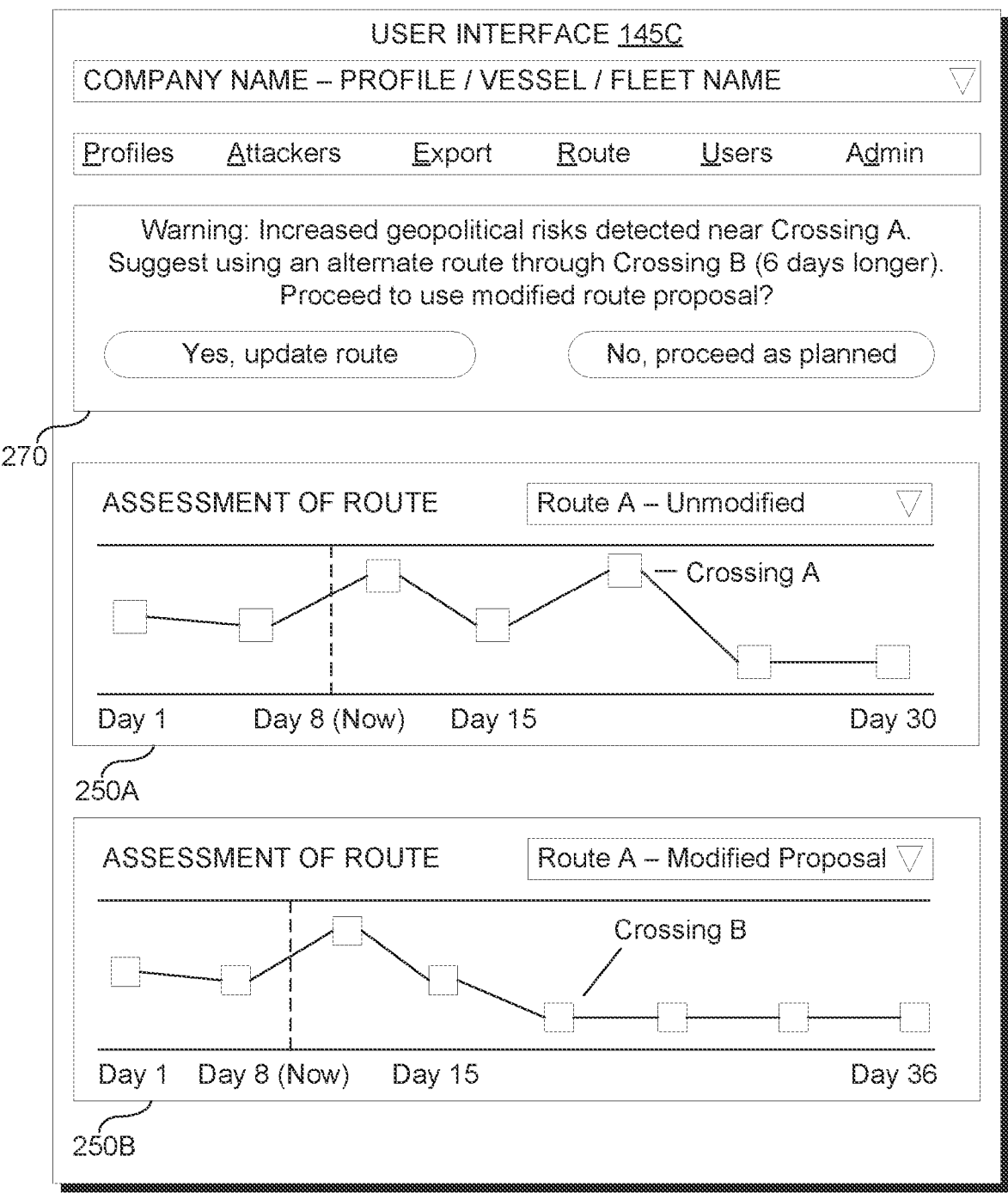
FIG. 2C is a diagram that depicts the GUI of FIG. 2A presenting actions for risk mitigation after updating the active risk model profile using a dynamic data callout interface.

FIG. 2C is a diagram that depicts user interface 145A of FIG. 2A presenting actions for risk mitigation after updating the active risk model profile using a dynamic data callout interface. User interface 145C may correspond to user interface 145 from FIG. 1. User interface 145C includes dynamic suggestion 270 and route risk assessment 250A and route risk assessment 250B.

As discussed above, dynamic risk updater 154 may use dynamic data callout interfaces to retrieve data updates from dynamic risk data sources 190A-190C. For example, dynamic risk updater 154 may receive a data update from dynamic risk data source 190B indicating that aggregated news and social media updates suggest an elevated risk of geopolitical conflict near "Crossing A". Accordingly, the active profile indicated by profile selector 210 may be updated according to the data update to reflect the elevated risk near "Crossing A", and the route risk assessment 250 from FIG. 2A may be updated to be displayed as route risk assessment 250A, wherein the traversal through "Crossing A" has an elevated risk level.

Dynamic risk updater 154 may automatically generate a recommendation to mitigate the risk update retrieved from dynamic risk data sources 190A-190C. For example, dynamic risk updater 154 may cause dynamic suggestion 270 to appear as a pop-up or notification to the user, wherein an alternative route is suggested through "Crossing B" instead. As shown in route risk assessment 250B, "Crossing B" has a much lower risk level compared to "Crossing A". However, the detour through "Crossing B" causes the total route to be delayed by 6 days. Thus, the user can weigh whether a timely arrival justifies the increased risk of staying the course, or whether a delay in the proposed alternative route is acceptable for a lower risk. After making a route selection, the navigation systems of the vessel may be updated to use the chosen route. While this example focuses on recommending an alternative route, dynamic suggestion 270 can also be used to suggest other mitigating actions for data updates received from dynamic data callout interfaces.

VI. Example Implementation Process

FIG. 3 is a flow diagram that depicts an approach for implementing a maritime cyber risk assessment profiling tool. To illustrate an example process, flow diagram 300 of FIG. 3 may be described with respect to FIG. 1 and FIG. 2A.

Flow diagram 300 depicts an approach for implementing a maritime cyber risk assessment profiling tool wherein blocks 302, 304, 306, and 308 may be performed on processor 120 of computing device 110A. Portions of flow diagram 300 may also be performed on a processor of a remote terminal, cloud server, or workstation.

In block 302, processor 120 executing risk profiler 150 accesses vessel risk profile 160 for one or more maritime vessels, wherein the risk profile includes a plurality of attack vectors targeting a plurality of systems associated with the one or more maritime vessels, or IT/OT system risks 162, and wherein each of the plurality of attack vectors is associated with a quantified risk value, which may include an ease of exploit rating and a reward rating. As discussed above, the quantified risk ratings may be retrieved from database 180 and may be adjusted according to other factors defined in vessel risk profile 160 including attacker profiles 163, cargo & use risks 164, location risks 165, time & date risks 166, and mitigation data 167.

In block 304, processor 120 executing risk profiler 150 retrieves a risk update from one of dynamic risk data source 190A-190C after dynamic risk data source 190A-190C detects a change in current risk conditions. As discussed above, the risk update may be retrieved by polling or a push notification and may indicate changed risk ratings along the vessel's route.

In block 306, processor 120 executing risk profiler 150 updates vessel risk profile 160 based on the risk update from block 304, wherein the updating includes updating a first attack vector from IT/OT system risks 162. The term "first attack vector" is used to indicate that at least one attack vector is updated, and not to imply a specific position or index for the first attack vector. For example, the reward value and/or the ease of exploit for the first attack vector may be adjusted to new values based on the risk update.

Further, while not specifically shown in FIG. 2B, a button or pop-up notification may be provided to allow the user to view and compare overall risk assessment 230 before and after vessel risk profile 160 is updated in block 360. This may enable the user to understand the risk effects of changing conditions as they happen in real-time.

In block 308, processor 120 executing risk profiler 150 causes display 140 to show user interface 145A including overall risk assessment 230 for the one or more maritime vessels based on the updated risk profile from block 306, wherein the overall risk assessment 230 includes risk values assigned for a particular set of the plurality of systems as indicated by the checked systems of system risk assessment 240, wherein the particular set includes a system with a risk value that changed based on the update to the first attack vector of block 306. For example, if the first attack vector was updated due to new vulnerability found in the alarm & control system that is easier to exploit, then the risk indicator in quadrant I of representation 234 may be shifted to the right to reflect the changed risk value indicating increased ease of exploit.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
accessing a risk profile for a plurality of maritime vessels;
wherein the risk profile includes a plurality of attack vectors targeting a plurality of systems associated with the plurality of maritime vessels;
wherein each of the plurality of attack vectors is associated with a quantified risk value;
wherein, for at least one attack vector of the plurality of attack vectors, the quantified risk value of the attack vector is based, at least in part, on vessel cargo of the plurality of maritime vessels;

wherein, for at least one attack vector of the plurality of attack vectors, the quantified risk value of the attack vector is based, at least in part on time, date and location of respective seafaring routes of the plurality of maritime vessels;
while the plurality of maritime vessels are progressing through the respective seafaring routes:
retrieving a risk update from a dynamic risk data source after the dynamic risk data source detects a change in current risk conditions;
wherein the risk update indicates an increased risk associated with a particular location on or near the respective seafaring routes;
updating the risk profile based on the risk update, wherein updating the risk profile includes updating a first attack vector of the plurality of attack vectors with an update that results in an increased risk value for the first attack vector; and
causing display of a risk assessment for the plurality of maritime vessels based on the updated risk profile, wherein the risk assessment includes risk values assigned for a particular set of the plurality of systems;
wherein the particular set of the plurality of system includes a system with a risk value that changed based on the update to the first attack vector; and
responding to the update by sending, to navigation systems of the plurality of maritime vessels, instructions that automatically cause the navigation systems of the plurality of maritime vessels to change the respective seafaring routes to alternative seafaring routes that are projected to reduce the risk value of the first attack vector.

2. The method of claim 1, wherein the particular set of the plurality of systems is selected according to a role of a user accessing the risk profile.

3. The method of claim 1, wherein the quantified risk value includes:
an ease of exploit rating; and
a reward rating.

4. The method of claim 3, wherein the risk assessment indicates the risk values in a heatmap using the ease of exploit rating and the reward rating as axes.

5. The method of claim 3, further comprising assigning to the plurality of attack vectors a distinct reward rating for each attacker motivation of a plurality of attacker motivations.

6. The method of claim 3, further comprising determining that the reward rating to assign to each attack vector of the plurality of attack vectors is based on at least one of:
stored cargo,
planned use,
geographic location, or
time and date.

7. The method of claim 1, wherein the risk assessment indicates risk over time as the plurality of maritime vessels traverse a seafaring route.

8. The method of claim 1, further comprising:
automatically generating a recommendation to mitigate the risk update.

9. The method of claim 1, wherein the risk update is retrieved via a push notification or periodic polling.

10. The method of claim 9, wherein a rate of the periodic polling is adjusted according to a magnitude of the risk update.

11. The method of claim 1, wherein the risk assessment further indicates a prior risk assessment based on the risk profile before the risk update.

12. The method of claim 1, further comprising:

causing display of one or more mitigation actions for risk reduction of the plurality of systems;

receiving a selection of the one or more mitigation actions; and causing display of the risk assessment to reflect the risk values being adjusted by the selection of the one or more mitigation actions.

13. The method of claim 1, wherein sending the instructions causes the navigation systems of the plurality of vessels to display a prompt before implementing the change in the respective seafaring routes.

14. One or more computing devices configured to:

access a risk profile for a plurality of maritime vessels;

wherein the risk profile includes a plurality of attack vectors targeting a plurality of systems associated with the plurality of maritime vessels;

wherein each of the plurality of attack vectors is associated with a quantified risk value;

wherein, for at least one attack vector of the plurality of attack vectors, the quantified risk value of the attack vector is based, at least in part, on vessel cargo of the plurality of maritime vessels;

wherein, for at least one attack vector of the plurality of attack vectors, the quantified risk value of the attack vector is based, at least in part on time, date and location of respective seafaring routes of the plurality of maritime vessels;

while the plurality of maritime vessels are progressing through the respective seafaring routes:

retrieve a risk update from a dynamic risk data source after the dynamic risk data source detects a change in current risk conditions;

wherein the risk update indicates an increased risk associated with a particular location on or near the respective seafaring routes;

update the risk profile based on the risk update, wherein updating the risk profile includes updating a first attack vector of the plurality of attack vectors with an update that results in an increased risk value for the first attack vector; and cause display of a risk assessment for the plurality of maritime vessels based on the updated risk profile, wherein the risk assessment includes risk values assigned for a particular set of the plurality of systems;

wherein the particular set of the plurality of system includes a system with a risk value that changed based on the update to the first attack vector; and respond to the update by sending, to navigation systems of the plurality of vessels, instructions that automatically cause the navigation systems of the plurality of vessels to change the respective seafaring routes to alternative seafaring routes that are projected to reduce the risk value of the first attack vector.

15. The computing device of claim 14, wherein the quantified risk value is configured to include:

an ease of exploit rating; and a reward rating.

16. The computing device of claim 15, wherein causing display of the risk assessment is configured to indicate the risk values in a heatmap using the ease of exploit rating and the reward rating as axes.

17. The computing device of claim 14, wherein causing display of the risk assessment is configured to select the particular set of the plurality of systems according to a user accessing the risk profile.

18. The computing device of claim 14 further configured to:

cause display of one or more mitigation actions for risk reduction of the plurality of systems;

receive a selection of the one or more mitigation actions; and cause display of the risk assessment to reflect the risk values being adjusted by the selection of the one or more mitigation actions.

19. The computing device of claim 14, wherein sending the instructions causes the navigation systems of the plurality of vessels to display a prompt before implementing the change in the respective seafaring routes.

20. A non-transitory computer readable medium comprising instructions executable by one or more computing devices to:

access a risk profile for a plurality of maritime vessels;

wherein the risk profile includes a plurality of attack vectors targeting a plurality of systems associated with the plurality of maritime vessels;

wherein each of the plurality of attack vectors is associated with a quantified risk value;

wherein, for at least one attack vector of the plurality of attack vectors, the quantified risk value of the attack vector is based, at least in part, on vessel cargo of the plurality of maritime vessels;

wherein, for at least one attack vector of the plurality of attack vectors, the quantified risk value of the attack vector is based, at least in part on time, date and location of respective seafaring routes of the plurality of maritime vessels;

while the plurality of maritime vessels are progressing through the respective seafaring routes:

retrieve a risk update from a dynamic risk data source after the dynamic risk data source detects a change in current risk conditions;

wherein the risk update indicates an increased risk associated with a particular location on or near the respective seafaring routes;

update the risk profile based on the risk update, wherein updating the risk profile includes updating a first attack vector of the plurality of attack vectors with an update that results in an increased risk value for the first attack vector; and cause display of a risk assessment for the plurality of maritime vessels based on the updated risk profile, wherein the risk assessment includes risk values assigned for a particular set of the plurality of systems;

wherein the particular set of the plurality of system includes a system with a risk value that changed based on the update to the first attack vector; and respond to the update by sending, to navigation systems of the plurality of vessels, instructions that automatically cause the navigation systems of the plurality of vessels to change the respective seafaring routes to alternative seafaring routes that are projected to reduce the risk value of the first attack vector.

* * * * *